(12) United States Patent
Milanovic

(10) Patent No.: US 9,683,647 B2
(45) Date of Patent: Jun. 20, 2017

(54) METHOD FOR MAKING A PINION FOR BEING ASSEMBLED ON A TURBINE AXIS OF AN INTERNAL COMBUSTION ENGINE

(71) Applicant: FPT Motorenforschung AG, Arbon (CH)

(72) Inventor: Dragoljub Milanovic, St. Gallen (CH)

(73) Assignee: FPT MOTORENFORSCHUNG AG, Arbon (CH)

( * ) Notice: Subject to any disclaimer, the term of this patent is extended or adjusted under 35 U.S.C. 154(b) by 175 days.

(21) Appl. No.: 14/679,820

(22) Filed: Apr. 6, 2015

(65) Prior Publication Data
US 2015/0285360 A1    Oct. 8, 2015

(30) Foreign Application Priority Data

Apr. 8, 2014  (EP) ..................... 14163882

(51) Int. Cl.
| | |
|---|---|
| *F16H 55/17* | (2006.01) |
| *F16H 57/00* | (2012.01) |
| *B23P 15/14* | (2006.01) |
| *F16D 1/06* | (2006.01) |
| *F16B 39/286* | (2006.01) |

(52) U.S. Cl.
CPC ............ *F16H 55/17* (2013.01); *B23P 15/14* (2013.01); *F16D 1/06* (2013.01); *F16H 57/0025* (2013.01); *F16B 39/286* (2013.01); *Y10T 29/49462* (2015.01); *Y10T 74/1987* (2015.01)

(58) Field of Classification Search
None
See application file for complete search history.

(56) References Cited

U.S. PATENT DOCUMENTS

| | | | | |
|---|---|---|---|---|
| 188,055 A | * | 3/1877 | Johnson ................ | F16B 39/286 411/291 |
| 678,629 A | * | 7/1901 | Smith ................... | F16B 39/286 411/291 |
| 1,087,056 A | * | 2/1914 | Ward ..................... | F16B 39/286 411/291 |
| 1,120,954 A | * | 12/1914 | Maher ................... | F16B 39/286 411/291 |
| 1,263,217 A | * | 4/1918 | Fine ....................... | F16B 39/286 411/291 |
| 1,291,114 A | * | 1/1919 | Pickin .................... | F16B 39/38 411/285 |
| 1,299,702 A | * | 4/1919 | Glass .................... | F16B 39/286 411/291 |
| 1,447,578 A | * | 3/1923 | Thomas .............. | F16B 39/2825 411/230 |

(Continued)

FOREIGN PATENT DOCUMENTS

| | | |
|---|---|---|
| CN | 203214816 | 9/2013 |
| DE | 235716 | 10/1910 |
| WO | WO0242665 | 5/2002 |

*Primary Examiner* — Jacob Cigna
(74) *Attorney, Agent, or Firm* — Stetina Brunda Garred and Brucker

(57) ABSTRACT

Assembling method of a pinion on a turbine axis of an internal combustion engine, wherein said pinion is made in a single piece having axial symmetry and equipped with an annular toothed part and with an axial part coaxial with said annular part and provided with a coaxial hole with a thread to screw the pinion on said axis of the turbine, wherein said thread has localized pitch variations.

7 Claims, 3 Drawing Sheets

(56) References Cited

U.S. PATENT DOCUMENTS

| | | | | | |
|---|---|---|---|---|---|
| 1,833,563 | A * | 11/1931 | Easter | F16B 39/286 411/291 |
| 2,035,859 | A * | 3/1936 | Bergstrom | F16B 39/286 411/291 |
| 2,142,819 | A * | 1/1939 | Olson | F16B 39/286 411/288 |
| 2,142,820 | A * | 1/1939 | Olson | F16B 39/286 411/288 |
| 2,231,130 | A * | 2/1941 | Lehre | F16B 39/286 411/285 |
| 2,235,405 | A * | 3/1941 | Markey | F16B 39/286 411/280 |
| 2,243,515 | A * | 5/1941 | Van Sant | F16B 39/286 411/291 |
| 2,304,310 | A * | 12/1942 | Luce | F16B 39/286 411/288 |
| 2,367,259 | A * | 1/1945 | Beach | F16B 39/286 411/285 |
| 2,391,712 | A * | 12/1945 | King | B23G 9/006 411/291 |
| 2,421,254 | A * | 5/1947 | Froelich | F04D 29/263 403/197 |
| 2,472,421 | A * | 6/1949 | Hamill | F16D 1/06 403/21 |
| 3,262,481 | A * | 7/1966 | Hanfland | F16B 39/286 411/291 |
| 3,265,109 | A * | 8/1966 | Hanfland | F16B 39/286 411/282 |
| 3,385,339 | A * | 5/1968 | Dahl | F16B 31/06 411/288 |
| 3,417,915 | A * | 12/1968 | Granberg | F04C 18/36 418/191 |
| 5,564,875 | A * | 10/1996 | Matthews | F16B 39/24 411/149 |
| 5,860,779 | A * | 1/1999 | Toosky | F16B 39/28 411/178 |
| 7,192,233 | B2 * | 3/2007 | Migita | F16B 39/286 411/230 |
| 2001/0018014 | A1 * | 8/2001 | Ito | F16B 31/021 411/288 |
| 2004/0028501 | A1 * | 2/2004 | Haraldsson | F16B 39/284 411/437 |
| 2009/0064480 | A1 * | 3/2009 | Migita | F16B 39/286 29/525.02 |
| 2014/0321946 | A1 * | 10/2014 | Thomas | F16B 31/02 411/432 |

* cited by examiner

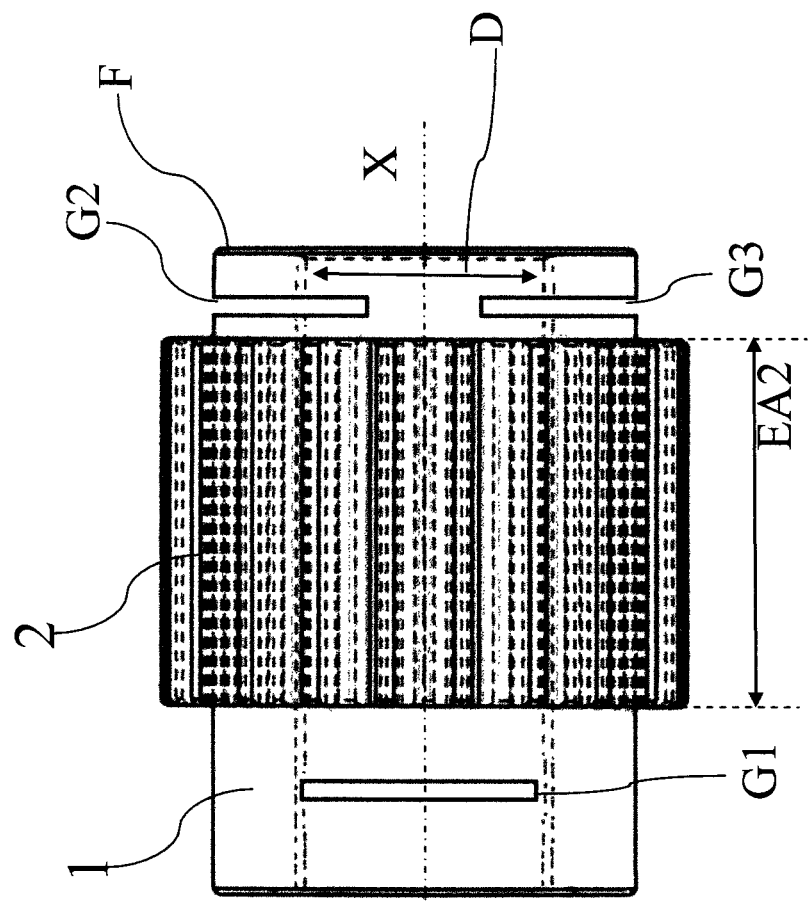
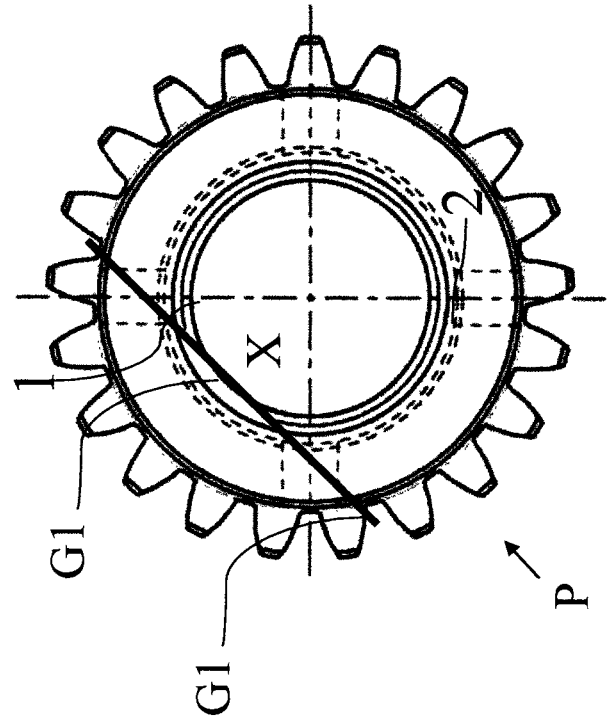
Fig.1A
Fig.1B

METHOD FOR MAKING A PINION FOR BEING ASSEMBLED ON A TURBINE AXIS OF AN INTERNAL COMBUSTION ENGINE

CROSS REFERENCE TO RELATED APPLICATIONS

The present application claims priority to European Patent Application No. 14163882.5 filed Apr. 8, 2014, the entirety of the disclosures of which are expressly incorporated herein by reference.

STATEMENT RE: FEDERALLY SPONSORED RESEARCH/DEVELOPMENT

Not Applicable.

APPLICATION FIELD OF THE INVENTION

The present invention refers to the field of the systems for assembling the components relating to the transmission of the motion of turbines of internal combustion engines and in particular to the assembling of a pinion on the respective axis of a turbine.

DESCRIPTION OF THE PRIOR ART

In general, turbines provided with pinions on their axis are intended to be connected to the drive shaft of the internal combustion engine, to obtain schemes and respective alternative embodiments of turbocompound systems.

The axis of the turbines in the automotive field are relatively thin, with a diameter comprised between 8 and 20 mm. The pinion is splined on this axis.

Grooved couplings of axial type cannot be used on such a thin axis, since they would weaken too much the axis itself.

According to a possible solution imagined by applicant, the pinion can be screwed on the turbine axis, but it is necessary to consider that if the turbine is in turbocompound configuration, then there is a step wherein the turbine generates mechanical torque and transfers it to the drive shaft, and a step wherein the drive shaft drives the turbine. In either of the two steps, according to the direction of the screw thread, the pinion can screw out of the shaft.

The use of radial pins or dowels is unfeasible, since it would induce an eccentricity of the masses that, at the speed of rotation reached by the turbine, would determine a fast wear of the bearings supporting the shaft itself.

Because of this problems, the most widespread assembling method is of the type "press to fit", which means that the pinion engages by force the turbine axis, obtaining a single piece that cannot be disassembled, namely that needs to be broken in order to separate its parts or that needs the pinion to be heated.

Such solution is not optimal.

SUMMARY OF THE INVENTION

Therefore the aim of the present invention is to provide a universal method for assembling a pinion on a respective turbine axis.

The pinion according to the present invention, made of a single piece, comprises two portions with axial symmetry, one annular to the other, wherein the external portion is toothed and the internal portion has a coaxial through hole provided, at least partially, with a thread.

The idea at the basis of the present invention is to introduce small and localized pitch variations on the thread of the through hole, by means of which the body of the pinion is associated to the shaft of a respective turbine.

Thus, small localized variations of the pitch of the thread are obtained, which advantageously increase the tightening friction of the pinion on the axis of the turbine.

According to a preferred method for realizing the pinion, partial cuts are made according to parallels of the internal portions, then the pinion is compressed or pulled axially and after that an internal thread is made.

The internal portion has a larger extension than the external portion so that, at least one of the ends, according to the axis of symmetry of the pinion, emerges with respect to the toothed portion.

Said partial cuts are made in correspondence of at least one of such ends.

Preferably, different cuts are made either consecutive but discontinuous on the same parallel or on reciprocally parallel parallels, with an appropriate angular offset.

Thus, such end tends to weaken if subject to an axial compression, which facilitates the making of said localized pitch variations of the thread.

According to a preferred alternative embodiment of the invention, one of the two ends of the internal part of the pinion integrates also a disc spring.

The properties of the disc spring can be exploited by making a turbine axis, having a fixed abutment ring nut and an adjacent thread.

By screwing the pinion on the turbine axis, when the end of the pinion defining the disc spring comes into contact with the fixed abutment ring nut, a step starts wherein such end starts to be compressed and deformed storing compression energy.

Such compression energy avoids the pinion to be unscrewed due to the torques applied to the pinion itself during the normal functioning of the respective turbine.

A first object of the present invention is a method of making a pinion for being assembled on a turbine axis of an internal combustion engine is object of the present invention, in accordance with claim 1.

Another object of the present invenzion is a pinion corresponding to the aforementioned method is also object of the present invention.

In addition, a further object of the present invention is a turbine comprising the aforementioned pinion and an internal combustion engine comprising said turbine.

The claims are an integral part of the present description describing preferred embodiment thereof.

BRIEF DESCRIPTION OF THE FIGURES

Further purposes and advantages of the present invention will become clear from the following detailed description of a preferred embodiment (and of its alternative embodiments) and the drawings that are attached hereto, which are merely illustrative and non-limitative, in which:

FIGS. 1A and 1B show an axial and a side view respectively of a pinion according to the present invention, FIG. 2 shows a preferred alternative embodiment of the pinion shown in FIG. 1B, while

In the figures the same reference numbers and letters identify the same elements or components.

DETAILED DESCRIPTION OF PREFERRED EMBODIMENTS OF THE INVENTION

With reference to FIG. 1A which shows an axial view of the pinion P that is object of the present invention and to FIG. 1B which shows a side view of the same pinion it is possible to see immediately that the pinion defines an axial symmetry according to the axis X; furthermore, although made in a single piece, it comprises:

- a first internal part 1 having a coaxial through hole H with internal diameter D and at least partially provided with thread TH1 and
- a second external part 2, toothed and annular with respect to the first part, wherein the first part 1 has a larger axial extension EA1 than the axial extension EA2 of the second part.

For a greater convenience, the first part is defined as axial and the second part as annular, although they are made in a single piece.

At least one end E and/or F of the axial part emerges axially with respect to the annular part.

With reference to FIG. 1B at least a partial cut G1, G2, G3, according to a parallel of the axial portion 1 is made on the end E and/or F in correspondence of the axial portion of coaxial hole intended to be provided with thread TH1 and having a smaller diameter D.

In a cylidrical shape, the concept of "parellel" is clear, being it circunpherintial to the cylinder according to an intersection with a plane perpendicular to the symmetry axis of the cylinder itself.

First said one or more further partial cuts G1, G2, G3 are made, then the pinion is subjected to an axial compression or traction and after that the internal thread TH1 is made.

FIG. 1A shows that the partial cuts G2 and G3 were made also consecutively on the same parallel of the end F, opposite to the aforementioned end E.

From FIG. 1A it can be understood that the partial cuts G1, G2, G3 reach, from the outside, the through hole H.

The consecutive cuts G2 and G3 are made on the same parallel.

The cuts can be made on different parallels, but preferably so that they are angularly offset between two adjacent parallels.

It is worth noting that the term partial cut has to be intended as a cut that does not affect the whole circumference of the first part 1, but a portion preferably smaller than 180°.

With reference to FIG. 1B it can be noted that the cut G1 is angularly offset with respect to the cuts G2 and G3 which belong to the same parallel.

Such cuts increase the axial elasticity of the pinion, so that the fact of making the thread while the pinion is subject to compression or to traction, determines a thread that locally has a respectively larger or smaller pitch.

This determines an increase of the tightening torque of the pinion on the axis SH which is advantageous to avoid the undesired unscrewing of the pinion from the axis.

Figure 2:
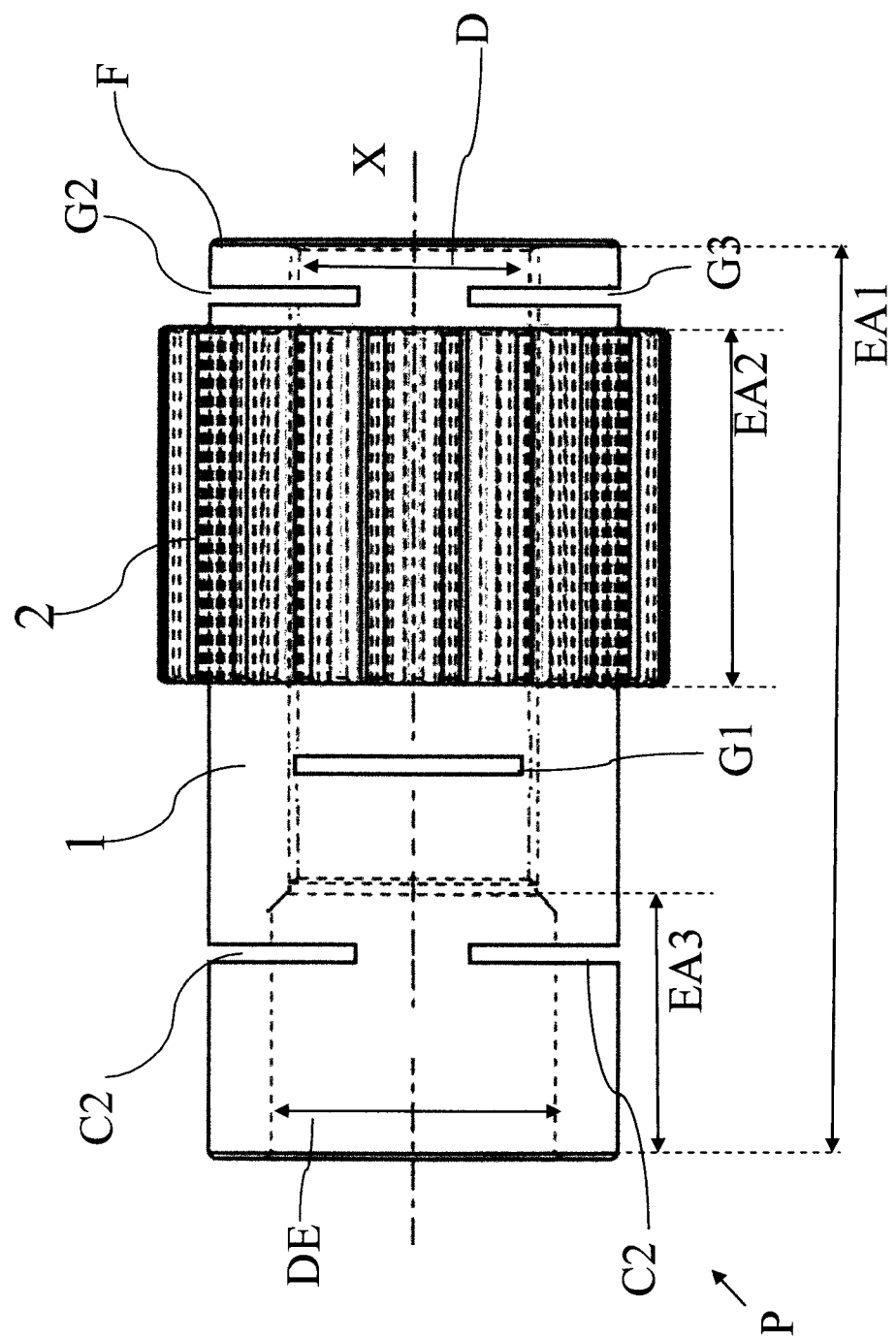
Figure 3:
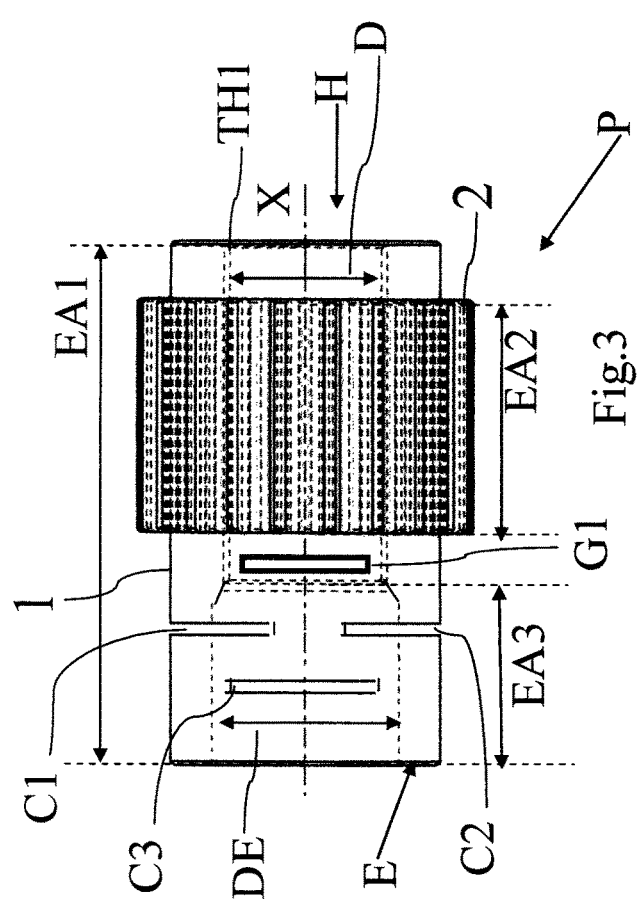
FIG. 3 shows a side view of the pinion of FIG. 3

With reference to the alternative embodiment of FIG. 2, it can be noted that the end E of the axial part 1 of the pinion has a limited portion EA3 wherein the axial hole H has a larger diameter DE than the remaining threaded portion.

Such portion EA3, indicating with the same symbol EA3 both the portion and its axial extension, has at least one partial cut C1, C2, C3 according to one or more parallels of the end E, in correspondence of said limited extension EA3.

From FIG. 1B it can be understood that the partial cuts C1, C2, C3 reach, from the outside, the through hole H.

Preferably, different cuts are made, either consecutive C1, C2 but discontinuous on the same parallel, or on reciprocally parallel parallels (C1, C2), C3, with an appropriate angular offset.

Such end E, thus, is weakened and, if subject to an axial compression, it behaves like a disc spring.

Figure 4:
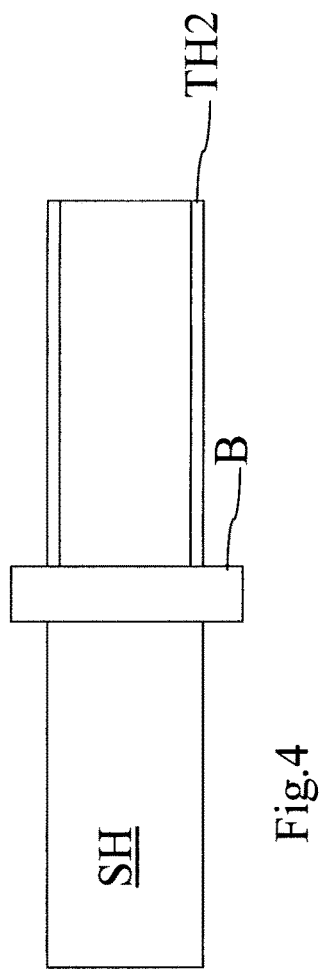
FIG. 4 shows a side view of a respective turbine axis on which the aforementioned pinion is intended to be assembled.

With reference to FIG. 4, the axis of the turbine SH has a threaded portion TH2 and a fixed ring nut B, that defines a stop point for the weakened end E of the pinion P.

Thus, according to such preferred alternative embodiment of the present invention, a pinion is made in a single piece comprising, in addition to the aforementioned local variation of the thread pitch TH1, an end E of the internal portion 1 which projects axially with respect to the toothed portion 2 and which is equipped with an axial hole having a larger diameter DE than the remaining part of the axial through hole H provided with thread and with weakening cuts C1, C2, C3 in correspondence of said end E. In other words, the end E is machined in order to define a disc spring.

As regards the further machining operations necessary to make the disc spring, the order in which they are carried out is not relevant.

For example, the toothing of the second part can be made after having made the weakened end E that defines a disc spring.

For example, the coaxial hole H can be made either before or after the different cuts C1, C2, C3, the same is valid also for the respective threaded part or for the widening of the diameter of the hole in the extension EA3.

The only order that it is necessary to respect is
making a coaxial hole;
applying axial traction or compression to the pinion
making said thread (TH1).

Advantageously, the end E has a larger elasticity, thus it is possible to exert a tightening torque that effectively opposes the undesired unscrewing of the pinion.

If it is necessary to replace the pinion, by applying an appropriate torque it is always possible to unscrew it without breaking or heating it.

While it can make sense to make the disc spring only on one of the ends (E), the partial cuts G1-G3 can be made on any one of the ends E, F or on both. This is because the local deformation of the thread carries out its function in any point of the thread TH1.

It will be apparent to the person skilled in the art that other alternative and equivalent embodiments of the invention can be conceived and reduced to practice without departing from the scope of the invention.

From the description set forth above it will be possible for the person skilled in the art to embody the invention with no need of describing further construction details. The elements and the characteristics described in the different preferred embodiments may be combined without departing from the scope of the present application. What is described in the description of the prior art, if not explicitly excluded in the detailed description, has to be considered in combination with the characteristics of the present invention, forming an integral part of the present invention.

In addition, the features disclosed in the description of the prior art are introduced only in order to better understand the invention and not as a declaration about the existence of known prior art.

The invention claimed is:

1. Method for making a pinion for being assembled on a turbine axis of an internal combustion engine, comprising at least one step of making a pinion in a single piece having axial symmetry, equipped with an annular toothed part (2) and with an axial part (1) coaxial with said annular part (2) and provided with a coaxial hole (H) with a thread (TH1) to screw the pinion (P) on said axis (SH) of the turbine, the method comprising a procedure to make said thread (TH1) in order to have localized pitch variations and further comprising the following steps:
   widening of a portion of coaxial hole (H) for a limited and predefined extension (EA3) of at least one emerging end (E) of said axial part (1) that axially emerges with respect to said annular toothed part (2), obtaining a larger diameter (DE) than the diameter (D) of the remaining threaded part,
   making of at least one further partial cut (C1, C2, C3) according to a parallel of the end (E) itself, in correspondence of such limited extension (EA3) to define a disc spring integrated in the emerging end (E) itself.

2. Method according to claim 1, comprising a step of making a turbine axis (SH) having a thread (TH2) complementary with the thread (TH1) of the pinion and a fixed abutment ring nut (B) with which said disc spring is intended to come into contact.

3. Method according to claim 1, wherein when said further partial cuts (C1, C2, C3) are more than one, they are arranged in a consecutive way on the same parallel or on different parallels.

4. Method according to claim 3, wherein when the further partial cuts are arranged on different parallels, they are angularly offset.

5. Method according to claim 1, comprising a step of making said axial part (1) so that at least one end (E, F) axially emerges with respect to said annular toothed part (2) and wherein said procedure comprises the following steps in a succession:
   making of said coaxial hole (H),
   making of one or more partial cuts according to at least one parallel, in correspondence of an emerging end (E, F) of said at least one end (E, F) that axially emerges with respect to said annular toothed part (2),
   axial traction or compression of said axial part,
   making of said thread (TH1).

6. Method according to claim 5, wherein when the partial cuts (G1, G2, G3) are more than one, they are arranged in a consecutive way on the same parallel or on different parallels.

7. Method according to claim 6, wherein when the partial cuts are arranged on different parallels, they are angularly offset.

* * * * *